(12) United States Patent
Nguyen et al.

(10) Patent No.: US 10,428,266 B2
(45) Date of Patent: Oct. 1, 2019

(54) FORMING PROPPANT-FREE CHANNELS IN PROPPED VERTICALLY ORIENTED FRACTURES

(71) Applicant: Halliburton Energy Services, Inc., Houston, TX (US)

(72) Inventors: Philip D. Nguyen, Houston, TX (US); Tatyana V. Khamatnurova, Houston, TX (US); Loan K. Vo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 50 days.

(21) Appl. No.: 15/569,684

(22) PCT Filed: May 27, 2015

(86) PCT No.: PCT/US2015/032653
§ 371 (c)(1),
(2) Date: Oct. 26, 2017

(87) PCT Pub. No.: WO2016/190864
PCT Pub. Date: Dec. 1, 2016

(65) Prior Publication Data
US 2018/0127643 A1 May 10, 2018

(51) Int. Cl.
*E21B 43/26* (2006.01)
*C09K 8/80* (2006.01)
(Continued)

(52) U.S. Cl.
CPC ............... *C09K 8/80* (2013.01); *C09K 8/805* (2013.01); *C09K 8/88* (2013.01); *C09K 8/882* (2013.01);
(Continued)

(58) Field of Classification Search
None
See application file for complete search history.

(56) References Cited

U.S. PATENT DOCUMENTS

| | | |
|---|---|---|
| 4,424,865 A | 1/1984 | Payton, Jr. |
| 6,752,208 B1 | 6/2004 | Nguyen |
| 7,281,581 B2 | 10/2007 | Nguyen et al. |

(Continued)

OTHER PUBLICATIONS

International Search Report and Written Opinion from PCT/US2015/032653 dated Feb. 26, 2016, 17 pages.

*Primary Examiner* — Angela M DiTrani Leff
(74) *Attorney, Agent, or Firm* — McGuireWoods LLP

(57) ABSTRACT

Methods of treating a subterranean formation having a vertically oriented fracture with a treatment fluid comprising an aqueous base fluid, a gelling agent, proppant particulates, and swellable particulates having an unswelled form and a swelled form; placing the treatment fluid into the vertically oriented fracture; swelling the swellable particulates at a first location against walls of the vertically oriented fracture, thereby forming a first swelled particulates plug; swelling the swellable particulates at a second location above or below the first location against the walls of the vertically oriented fracture, thereby forming a second swelled particulates plug; and settling the proppant particulates atop the first swelled particulates plug and the second swelled particulates plug to form a proppant-free channel.

20 Claims, 2 Drawing Sheets

(51) Int. Cl.
*E21B 43/267* (2006.01)
*C09K 8/88* (2006.01)
*C09K 8/90* (2006.01)
*C09K 8/92* (2006.01)
*E21B 33/134* (2006.01)

(52) U.S. Cl.
CPC .............. *C09K 8/885* (2013.01); *C09K 8/887* (2013.01); *C09K 8/90* (2013.01); *C09K 8/92* (2013.01); *E21B 33/134* (2013.01); *E21B 43/267* (2013.01)

(56) References Cited

U.S. PATENT DOCUMENTS

| | | | |
|---|---|---|---|
| 7,581,590 B2 | 9/2009 | Lesko et al. | |
| 7,931,084 B2* | 4/2011 | Nguyen | C09K 8/685 166/278 |
| 8,066,068 B2 | 11/2011 | Lesko et al. | |
| 8,490,700 B2 | 7/2013 | Lesko et al. | |
| 2008/0142222 A1* | 6/2008 | Howard | B01D 39/1646 166/295 |
| 2009/0124522 A1 | 5/2009 | Roddy | |
| 2009/0176667 A1 | 7/2009 | Nguyen | |
| 2010/0089581 A1 | 4/2010 | Nguyen et al. | |
| 2011/0036583 A1* | 2/2011 | Willberg | E21B 43/26 166/308.1 |
| 2011/0240293 A1* | 10/2011 | Lesko | C09K 8/665 166/280.1 |
| 2014/0060827 A1* | 3/2014 | Nguyen | E21B 43/267 166/280.1 |
| 2014/0060829 A1* | 3/2014 | Nguyen | C09K 8/80 166/280.1 |
| 2014/0284046 A1 | 9/2014 | Bramwell | |
| 2016/0003021 A1* | 1/2016 | Nelson | E21B 43/267 166/280.2 |

* cited by examiner

FORMING PROPPANT-FREE CHANNELS IN PROPPED VERTICALLY ORIENTED FRACTURES

BACKGROUND

The embodiments herein relate generally to subterranean formation operations and, more particularly, to forming proppant-free channels in propped vertically oriented fractures.

Subterranean wells (e.g., hydrocarbon producing wells) are often stimulated by hydraulic fracturing treatments. In hydraulic fracturing treatments, a treatment fluid is pumped into a portion of a subterranean formation at a rate and pressure such that the subterranean formation breaks down and one or more fractures are formed. Typically, particulate solids are then deposited in the fractures. These particulate solids, or "proppant particulates" or "proppant," serve to prevent the fractures from fully closing once the hydraulic pressure is removed by forming a proppant pack. As used herein, the term "proppant pack" refers to a collection of proppant particulates in a fracture. By keeping the fracture from fully closing, the proppant particulates aid in forming conductive paths through which fluids may flow.

The degree of success of a fracturing operation depends, at least in part, upon fracture porosity and conductivity once the fracturing operation is stopped and production is begun. The porosity and conductivity of a proppant pack is thus related to the interconnected interstitial spaces between the abutting proppant particulates in the proppant pack, and, accordingly, closely related to the strength of the placed proppant (e.g., if the placed proppant crushes, then the pieces of broken proppant may plug the interstitial spaces) and the size and shape of the placed proppant (e.g., more spherical proppant particulates generally yield increased interstitial spaces between the particulates).

When fractures close on a proppant pack upon removal of hydraulic pressure, the fractures may crush or compact the proppant particulates, potentially forming non-permeable or low permeability masses within the fracture, rather than desirable high permeability masses. Such low permeability masses may choke the flow path of the fluids within the formation. Furthermore, the proppant particulates may become embedded in particularly soft formations, negatively impacting production.

One way to increase conductivity of proppant packs involves the placement of proppant aggregates comprised of multiple individual proppant particulates. The larger size of the proppant aggregates compared to individual proppant particulates allows a reduced volume of proppant to be placed into the fracture while maintaining the structural integrity required to keep the fracture from closing and crushing the proppant aggregates. Accordingly, the spaces between the proppant aggregates through which produced fluids flow may be larger than the interstitial spaces that would be present between individual proppant particulates. Typical proppant aggregates are formed by agglomerating proppant particulates using a resin or tackifying agent, for example, that may, or may not, remain tacky after the aggregates have formed.

Another method proposed to increase the conductivity of proppant packs is to pump a substantially solids free fluid intermittently between pumping proppant particulates. The solids free fluid forms spaces within the proppant pack by preventing individual proppant particulates from gathering particularly close to one another. These spaces, or "proppant-free channels," form conductive channels through which produced fluids may flow. Such intermittent pumping may be deleterious to operational equipment, as it requires the constant turning on and off of the equipment. Additionally, the intermittent pumping may cause additives in either the solids free fluid or other treatment fluids to settle out during the constant pressure changes (i.e., as the pumping equipment is stopped and begun again) and/or deposition of the additives in undesired locations in the subterranean formation.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1A:
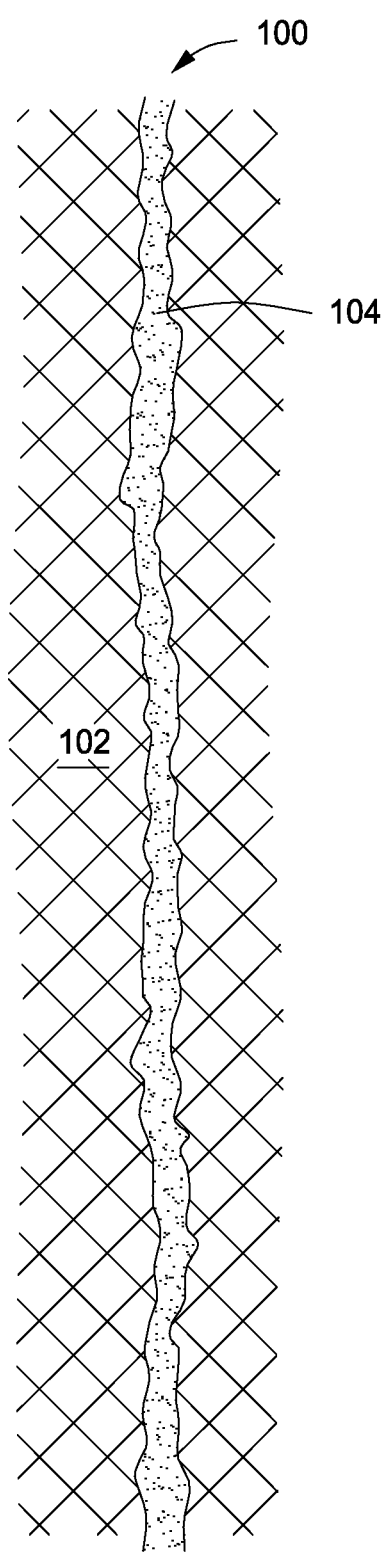
FIGS. 1A and 1B depict a cross-section of a vertically oriented fracture during the process of forming proppant-free channels according to one or more embodiments of the present disclosure.

The embodiments herein relate generally to subterranean formation operations and, more particularly, to forming proppant-free channels in propped vertically oriented fractures.

The embodiments herein take advantage of the natural tendency of proppant particulates to settle in a treatment fluid and the ability of swellable particulates to swell in the presence of an aqueous base fluid and restrict flow in certain geometrically oriented fractures. More particularly, the embodiments of the present disclosure relate to treatment fluids comprising proppant particulates and swellable particulates. Upon placement in a vertically oriented fracture, the swellable particulates swell against the walls of the fracture to form a plug (or bridge). Subsequently, the proppant particulates settle atop the plug to form a proppant-free channel thereabove when multiple plugs are formed. As used herein, the term "vertically oriented fracture" (or simply "vertical fracture"), and grammatical variants thereof, refers to a fracture in a subterranean formation disposed at a substantial right angle to the Earth's surface; the term contemplates fractures that are truly vertical as well as those that are not necessarily truly vertical, encompassing angles at true vertical or deviated up to 30° from true vertical.

As used herein, the term "proppant-free channels," and grammatical variants thereof, refers to areas in a propped fracture that are void or largely void and capable of allowing produced fluid to flow therethrough. The "void" space of the proppant-free channels of the present disclosure have no more than about 30% of the area of the proppant-free channel comprising solids (e.g., solid particulates). Such solids may be the proppant particulates themselves (e.g., those that do not settle), or formation fines that have sloughed off the formation during an operation (e.g., during fracturing, and the like), other solids included in a fluid introduced downhole to perform a particular operation, and the like. Such proppant-free channels may be capable of communicating fluids from the subterranean formation and into a wellbore for production.

The embodiments of the present disclosure enhance the vertical distribution of proppant particulates by forming proppant-free channels disposed between a swelled swellable particulates plug having settled proppant particulates thereon (also referred to simply as a "proppant pillar" herein). Accordingly, the embodiments described herein enhance conductivity of the propped fracture and, thus, production of the wellbore in the subterranean formation. The swelled swellable particulates form a plug, as described in greater detail below, to promote a bridging effect and mitigate the settling of proppant particulates below the plug, thus increasing vertical proppant distribution of the proppant particulates, as well as forming the proppant pillars and proppant-free channels described herein. Additionally, the methods of the present disclosure do not depend on intermittent pumping of dual fluids to produce proppant-free channels. Instead, the methods described herein employ continuous pumping of a single treatment fluid. Moreover, the embodiments described herein may require treatment fluids with reduced gelling agent loadings (and crosslinker loadings, if used) because the plugs employ a mechanical bridging technique to prevent proppant settling to a single location, thus reducing cleanup needs for gelling agent/crosslinking agent residue in the formation. Furthermore, because of the mechanical bridge plug, lower quality proppant particulates may be used. Accordingly, the methods described herein may reduce costs, for example, by minimizing wear and tear on pumping equipment (e.g., by eliminating the turning off and on of the pumping equipment).

In some embodiments, the methods and compositions described herein may be with reference to a hydraulic fracturing operation. The methods described herein may be used in any other subterranean formation operation that may benefit from the formation of a particulate pack having particulate-free channels therein. Such subterranean formation operations may include, but are not limited to, a stimulation operation, an acid-fracturing operation, a frac-packing operation, and any combination thereof.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." As used herein, the term "about" encompasses +/−5% of a numerical value.

Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

As used herein, the term "substantially" means largely, but not necessarily wholly.

In some embodiments, the present disclosure provides a method of introducing a treatment fluid into a subterranean formation comprising a vertically oriented fracture. In some embodiments, the treatment fluid may be introduced at a rate and pressure above the fracture gradient to create or enhance the vertically oriented fracture. In other embodiments, a pad fluid may be introduced into the subterranean formation prior to the treatment fluid at a rate and pressure above the fracture gradient to create or enhance the vertically oriented fracture. The treatment fluid comprises an aqueous base fluid, a gelling agent, proppant particulates, and swellable particulates having an unswelled form and a swelled form.

The treatment fluid is placed into the vertically oriented fracture, which may be done in the process of creating or enhancing the vertically oriented fracture, without departing from the scope of the present disclosure. Within the vertically oriented fracture, the swellable particulates swell at a first location against the walls thereof. As used herein, the term "walls" with reference to the vertically oriented fracture refer to a surface of the fracture that is contacted with the treatment fluid. The swollen swellable particles thus form a first swelled particulates plug. As used herein, the term "plug" formed by the swellable particulates described herein refers to a plug that is not necessarily impermeable to the flow of fluids, but is impermeable to at least about 70% of the proppant particulates in a treatment fluid. Additionally, at least a second swelled particulates plug is formed at a second location either above or below the first swelled particulates plug. Thereafter, the proppant particulates settle atop the first swelled particulates plug and the second swelled particulates plug. Accordingly, if the second swelled particulates plug is formed above the first swelled particulates plug, a proppant-free channel is formed below the second swelled particulates plug and above the settled proppant particulates atop the first swelled particulates plug, and if the second swelled particulates plug is formed below the first swelled particulates plug, a proppant-free channel is formed below the first swelled particulates plug and above the settled proppant particulates atop the second swelled particulates plug.

The process of forming a swelled particulates plug may be performed at a variety of locations along the length of the vertically oriented fracture, such that multiple proppant-free channels are formed. The swelled particulates plug may generally be randomly located along the length of the vertically oriented fracture, such that the proppant-free channels are of varying sizes (e.g., varying area through which produced fluids may flow). In other embodiments, however, the spacing of the one or more swelled particulates plug may be uniform, thereby forming substantially uniformly sized proppant-free channels. The size of the proppant-free channels is dependent not only upon the distance between each swelled particulates plug, but also the size of the proppant pillar (the plug+the settled proppant particulates), the geometry of the vertically oriented fracture (e.g., some areas may be wider or more narrow than others), and the like.

After the formation of the one or more proppant-free channels, the one or more swelled particulates plugs, and the settled proppant particulates, the hydraulic pressure may be removed from the subterranean formation such that the fracture experiences fracture closure stress. As used herein, the term "fracture closure stress" (or simply "closure stress") refers to the force or pressure that a subterranean formation will exert on proppant placed in a formation or fracture upon hydraulic pressure removal. Closure stresses from the subterranean formation on the proppant located in the fractures can be as high as 10,000 to 15,000 or more pounds force per square inch (psi). Such closure stresses serve to maintain the proppant particulates (e.g., the settled proppant particulates) in place within the fracture. Thereafter, the remaining liquid portion and any unconsolidated solids portion of the treatment fluid, or any unconsolidated portions of the subterranean formation not previously removed (e.g., during removal of a pad fluid), may be produced back to the surface for removal from the subterranean formation. Thereafter, the formation may begin producing hydrocarbons before or after any additional operations are performed.

Figure 1B:
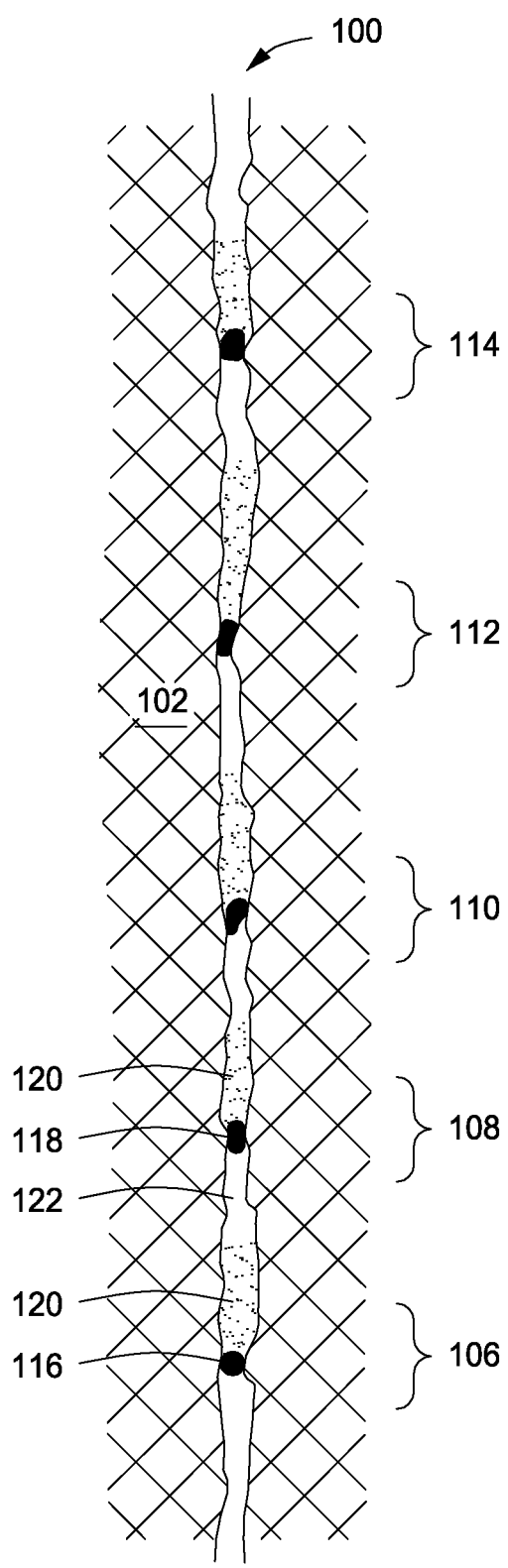

Referring now to FIGS. 1A and 1B, illustrated is a cross-section of a vertically oriented fracture 100 during the process of forming proppant-free channels according to one or more embodiments of the present disclosure. The fracture 100 is in a subterranean formation 102. Referring now to FIG. 1A, the treatment fluid 104 according to the embodiments of the present disclosure is paced therein, where the treatment fluid comprises a mixture of proppant particulates and unswelled swellable particulates in a gelled aqueous base fluid. As shown, the proppant particulates and the unswelled swellable particulates are generally in a homogeneous mixture in the treatment fluid 104 upon introduction into the fracture 100.

Referring now to FIG. 1B, the fracture 100 may have at least a first location 106 and a second location 108. However, as shown, additional locations, such as a third location 110, a fourth location 112, and a fifth location 114, or any number of additional locations may also be present according to the methods of the present disclosure for forming a swelled particulates plug and subsequently the proppant-free channels described herein, without departing from the scope of the present disclosure. Moreover, as shown, the size and location relative to the fracture 100 and any other location 106-114 may be uniform or random, without departing from the present disclosure.

As a non-limiting example, the unswelled swellable particulates may swell after placement in the fracture 100 at a first location 106 and at a second location 108 (as well as other locations), thereby forming a first swelled particulates plug 116 and a second swelled particulates plug 118. As shown, the first swelled particulates plug 116 is formed below the second swelled particulates plug 118; however, in some embodiments the first swelled particulates may be formed above the second swelled particulates plug, without departing from the scope of the present disclosure. The first and second swelled particulates plugs 116,118 are formed by swelling the swelled particulates against the walls of the fracture 100. The proppant particulates 120 are then able to settle atop the swelled particulates plugs 116,118, thereby forming a proppant-free channel 122 below the second swelled particulates plug 118 and above the settled proppant particulates 120 atop the first swelled particulates plug 116. In those embodiments in which the second swelled particulates plug is located below the first swelled particulates plug, then accordingly, a proppant-free channel would be formed below the first swelled particulates plug and above the settled proppant particulates atop the second swelled particles plug.

As shown, more than one proppant-free channel may be formed in a fracture in accordance with the embodiments of the present disclosure, without departing from the scope described herein. That is, the process of forming two swelled particulates plugs having proppant particulates settled thereon to form a proppant-free channel therebetween may be repeated multiple times throughout the length of the vertically oriented fracture. In doing so, the conductivity or productivity of the fracture may be enhanced by increasing the areas for produced fluids to freely flow.

The treatment fluids of the present disclosure comprise an aqueous base fluid. Suitable aqueous base fluids may include, but are not limited to, fresh water, saltwater (e.g., water containing one or more salts dissolved therein), brine (e.g., saturated salt water), seawater, produced water (e.g., water produced as a byproduct from a hydrocarbon producing subterranean formation), wastewater (e.g., water that has been adversely affected in quality by anthropogenic influence) that has been treated or untreated, and any combination thereof. Generally, the water may be from any source, provided that it does not contain components that might adversely affect the stability and/or performance of the treatment fluids. In certain embodiments, the density of the aqueous base fluid can be adjusted, among other purposes, to provide additional gel strength to the treatment fluids. In certain embodiments, the pH of the aqueous base fluid may be adjusted (e.g., by a buffer or other pH adjusting agent) to a specific level, which may depend on, among other factors, the amounts of the various components in the treatment fluid, the types of the various components in the treatment fluid, and the like. In some embodiments, the pH range may range from a lower limit of about 4 to an upper limit of about 11.

The gelling agents for use in the treatment fluids of the present disclosure may increase the viscosity thereof, such as to transport the proppant particulates and swellable particulates to the vertically oriented fracture described herein in a subterranean formation. Suitable gelling agents may include, but are not limited to, natural polymers, synthetic polymers, and any combination thereof. Oligomers, including those listed herein, capable of associating to form higher viscosity networks may also be used as the gelling agents herein, without departing from the scope of the present disclosure.

Suitable gelling agents may include, but are not limited to, polysaccharides, biopolymers, and/or derivatives thereof that contain one or more of these monosaccharide units: galactose, amylose, mannose, glucoside, glycosaminoglycan, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and derivatives and any combination thereof. In certain embodiments, the gelling agent may comprise an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids described herein in an amount in the range of from a lower limit of about 0.001%, 0.01%, 0.025%, 0.05%, 0.075%, 0.1%, 0.125%, 0.15%, 0.175%, 0.2%, 0.225%, and 0.25%, to an upper limit of about 0.5%, 0.475%, 0.45%, 0.425%, 0.4%, 0.375%, 0.35%, 0.325%, 0.3%, 0.275%, and 0.25% by weight per volume (wt/vol) of the aqueous base fluid, encompassing any value and subset therebetween. Each of these values is critical to the performance of the methods described herein, where amount of gelling agent may be dependent on the type of aqueous base fluid selected; the type, size, and amount of proppant particulates selected; the type, size, and amount of swellable particulates; the buoyancy of the proppant particulates and swellable particulates; and the like.

In some embodiments, it may be desirable to crosslink the gelling agent and the treatment fluids may further comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and any combination thereof.

In certain embodiments, the crosslinking agent may be formulated to remain inactive until it is "activated" by, among other things, certain conditions in the treatment fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place, or by frangibility of the encapsulating material such that the crosslinking agent is released upon encountering a stress (e.g., removal of hydraulic pressure and fracture closure).

The encapsulating material may be any material capable of delaying the action of the crosslinking agent including, but not limited to, a wax, polyvinyl alcohol, a polymer, a protein, a polysaccharide, a degradable material, or any combination thereof. Examples of such encapsulating materials may include, but are not limited to, polylactic acid, polyglycolic acid, a polyamide, a polyalkylene glycol (e.g., polyethylene glycol), polyvinyl alcohol, polyvinyl ester, polysiloxane, polyurethane, polyurethane copolymers, polyacrylic acid, a polyacrylic acid derivative, collagen, gelatin, a cellulose derivative (e.g., alkyl cellulose, hydroxyalkyl cellulose, cellulose acetate, and the like), and any combination thereof.

The choice of a particular crosslinking agent may be governed by several considerations including, but not limited, the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules. When included, suitable crosslinking agents may be present in the treatment fluids in an amount sufficient to provide the desired degree of crosslinking between molecules of the gelling agent. In certain embodiments, the crosslinking agent may be present in the treatment fluids in an amount in the range of from a lower limit of about 0.001%, 0.005%, 0.01%, 0.015%, 0.02%, 0.025%, 0.03%, 0.035%, 0.04%, 0.045%, and 0.05% to an upper limit of about 0.1%, 0.095%, 0.09%, 0.085%, 0.08%, 0.075%, 0.07%, 0.065%, 0.06%, 0.055%, and 0.05% wt/vol of the base fluid of the treatment fluid, encompassing any value and subset therebetween. Each of these values is critical to the performance of the methods described herein, where amount of crosslinking agent may depend on a number of factors including, but not limited to, the amount and type of gelling agent, the type of base fluid selected, the desired viscosity, and the like.

The proppant particulates may be any material, naturally-occurring or man-made, suitable for use in a subterranean formation and appropriate for use in the embodiments as described herein. Suitable proppant particulates for use in the embodiments of the present disclosure may include, but are not limited to, sand (e.g., desert sand, beach sand), cementitious material (e.g., Portland cement, Portland cement blends (e.g., blast-furnace slag), and non-Portland cement (e.g., super-sulfated cement, calcium aluminate cement, high magnesium-content cement, and the like), and the like), bauxite, alumino-silicate material, ceramic material (e.g., ceramic microspheres), glass material, polymeric material (e.g., ethylene-vinyl acetate or composite materials), metal (e.g., alkali metals, alkaline earth metals, transition metals, post-transition metals, metalloids), zeolites, polytetrafluoroethylene material, thermoplastic material (e.g., nylon thermoplastic) nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, nanoparticulates, and any combination thereof.

The shape of the proppant particulates may be such that it is substantially spherical or substantially non-spherical, which may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the proppant particulates are substantially non-spherical, the aspect ratio of the material may range such that the material is fibrous to such that it is cubic, octagonal, or any other configuration.

In some embodiments, the proppant particulates may be further coated with a curable resin composition to enhance grain to grain contact between the proppant particulates and to thereafter cure into a hardened mass settled atop a swelled particulates plug which may prevent the migration of individual proppant particulates into the proppant-free channel and enhance the structure of the settled proppant particulates to withstand closure stresses. Coating of the proppant particulates may additionally benefit in helping ensure uniform mixing and distribution of the swellable particulates in the treatment fluid by minimizing their segregation or separation from the proppant particulates. The term "coating," and grammatical variants thereof (e.g., "coated," "coat," and the like) with reference to the proppant particulates coated with a curable resin described herein does not imply complete coverage of the proppant particulates with the curable resin, but rather that at least about 50% (or at least about 60%, 70%, 80%, 90%, or 100%) of the outer surface of the proppant particulates are coated with the curable resin. As used herein, the term "curable resin" may be interchangeably used with simply the term "resin," and refers to any of numerous physically similar polymerized synthetics or chemically modified natural resins including thermoplastic materials and thermosetting materials. Resins that may be suitable for use in the embodiments of the present disclosure may include substantially all resins known and used in the art.

Curable resin compositions suitable for use as an adhesive substance generally comprise a curable resin and a curing agent. Suitable curable resins may include, but are not limited to, two-component epoxy-based resins, glycidyl ether resins, butoxymethyl butyl glycidyl ether resins, novolak resins, polyepoxide resins, urea-aldehyde resins, urethane resins, polyurethane resins and hybrids and copolymers thereof, phenolic resins, phenol-aldehyde resins, bisphenol A diglycidyl ether resins, bisphenol A-epichlorohydrin resins, phenol formaldehyde resins, phenolic/latex resins, furan resins, furan/furfuryl alcohol resins, polyester resins and hybrids and copolymers thereof, acrylate resins, and any combination thereof. It is within the ability of one skilled in the art, with the benefit of this disclosure, to select a suitable curable resin for use in curable resin composition and to determine whether and which curing agent is required to trigger curing.

The curing agent in the curable resin composition that acts on a curable resin so that it forms a hardened, consolidated mass. The type of curing agent depends on the curable resin chosen. For example, some suitable curable resins, such as epoxy resins, may be hardened with a curing agent that is an internal catalyst or activator. These curable resin compositions, when pumped down hole, may be cured using only time and temperature. Other suitable curing agents are used when the curable resins (e.g., a furan resin) require a time-delayed catalyst or an external catalyst to help activate the polymerization of the curable resins if the cure temperature is low (i.e., less than about 250° F.), but will cure under the effect of time and temperature if the formation temperature is above about 250° F.

Examples of suitable curing agents may include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and any combination thereof.

The curing agent may be included in the curable resin compositions in an amount in the range of from a lower limit of about 5%, 10%, 15%, 20%, 25%, and 30% to an upper limit of about 60%, 55%, 50%, 45%, 40%, 35%, and 30%, encompassing every value and subset therebetween. Each of these values is critical to the embodiments of the present disclosure and may depend on a number of factors including, but not limited to, the type of curable resin, the type of curing agent, the type of aqueous base fluid, the desired resin effect, the subterranean formation conditions (e.g., the downhole temperature), and the like.

As stated, the chosen curing agent may affect the range of temperatures over which a curable resin is able to cure. For example, curing agents that comprise piperazine or a derivative of piperazine have been shown capable of curing various curable resins from temperatures as low as about 70° F. to as high as about 350° F. By way of example, for temperatures closer to 70° F., a mixture of bisphenol A diglycidyl ether resin and bisphenol A-epichlorohydrin resin may be suitable. For temperatures closer to 350° F., a mixture of aliphatic glycidyl ether, bisphenol A/novolac epoxy resin, and bisphenol A-epichlorohydrin resin may be suitable.

Any solvent that is compatible with the curable resin compositions and achieves the desired viscosity effect for coating onto the proppant particulates is suitable for use in the present disclosure. Solvents suitable for use in the present disclosure may include, but are not limited to, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and any combination thereof.

Suitable curable resin compositions also may comprise a silane coupling agent, among other things, to act as a mediator to help bond the curable resin to the proppant particulates; a surfactant for, among other things, facilitating the coating of proppant particulate prior to placement in a subterranean formation; and an optional liquid carrier fluid for, among other things, reducing the viscosity of the curing agent component.

In some embodiments, the proppant particulates of the present disclosure may have an average particle size distribution (d50) such that they are sized in the range of from a lower limit of 10 micrometers (μm), 100 μm, 200 μm, 300 μm, 400 μm, 500 μm, 600 μm, 700 μm, 800 μm, 900 μm, and 1000 μm to an upper limit of about 2000 μm, 1900 μm, 1800 μm, 1700 μm, 1600 μm, 1500 μm, 1400 μm, 1300 μm, 1200 μm, 1100 μm, and 1000 μm, encompassing any value and subset therebetween. Each of these values is critical to the embodiments of the present disclosure and may depend on a number of factors including, but not limited to, the desired crush resistance, the type of proppant particulate selected, the closure stress of the fracture, the type of swellable particulate selected, the desired settling rate in the treatment fluid, and the like.

In some embodiments, the proppant particulates may be present in the treatment fluid of the present disclosure in an amount in the range of a lower limit of about 0.1 pounds per gallon (lbm/gal), 0.5 lbm/gal, 1 lbm/gal, 2 lbm/gal, 3 lbm/gal, 4 lbm/gal, 5 lbm/gal, 6 lbm/gal, 7 lbm/gal, 8 lbm/gal, 9 lbm/gal, and 10 lbm/gal to an upper limit of about 20 lbm/gal, 19 lbm/gal, 18 lbm/gal, 17 lbm/gal, 16 lbm/gal, 15 lbm/gal, 14 lbm/gal, 13 lbm/gal, 12 lbm/gal, 11 lbm/gal, and 10 lbm/gal of the aqueous base fluid in the treatment fluid, encompassing any value and subset therebetween. There are 11.826 grams per liter (g/L) per 1 lbm/gal. Each of these values is critical to the embodiments of the present disclosure and may depend on a number of factors including, but not limited to, the type of proppant particulates selected, the desired size of the settled proppant particulates atop one or more swelled particulates plugs, the desired size of the proppant-free channels, and the like.

The swellable particulates of the present disclosure have an unswelled form and a swelled form. Generally, the swellable particulates swell in the presence of an aqueous base fluid. The swellable particulates may themselves be entirely formed of a swellable material (i.e., a swellable material particle) or may be a non-swellable particle coated with a swellable material (i.e., any solid, non-swellable particulate (including the proppant particulates described herein) coated with a swellable material). As used herein, the term "coating," and grammatical variants thereof (e.g., "coated," "coat," and the like) with reference to non-swellable particles coated with a swellable material for forming the swellable particulates described herein does not imply complete coverage of the non-swellable particles with the swellable material, but rather that at least about 50% (or at least about 60%, 70%, 80%, 90%, or 100%) of the outer surface of the non-swellable particles are coated with the swellable material. A combination of these types of swellable particulates may also be used in accordance with the embodiments of the present disclosure. In some embodiments, the use of swellable material particles as the swellable particulates may be beneficial in ensuring maximum swellable material for swelling and forming the swelled particulates plug. The use of the non-swellable particles coated with a swellable material as the swellable particulates may be beneficial in imparting structural integrity to the swelled particulates plug. Accordingly, one or both, or a mixture thereof, may be desired depending on a number of factors including, but not limited to, the desired swelling of the swellable particulates, the desired structural integrity of the swelled particulates plug, the geometry of the vertically oriented fracture, the closure stress of the fracture, and the like.

Regardless of whether the swellable particulates selected are swellable material particles and/or non-swellable particles coated with a swellable material, the swellable material may be any material capable of swelling in the presence of an aqueous base fluid and under downhole conditions. As used herein, the term "swellable particulates" encompasses both the swellable material particles and the non-swellable particles coated with a swellable material, unless otherwise specified. The swellable material forming the all or a portion of the swellable particulates described herein may be synthetic or naturally-occurring. Suitable swellable materials may include, but are not limited to a natural polymer, a synthetic polymer, a shape-memory alloy, a shape-memory polymer, and any combination thereof.

Examples of suitable natural polymers for use as the swellable material described herein may include, but is not limited to, a polysaccharide, a salt of a polysaccharide (e.g., a salt of a cross-linked carboxyalkyl polysaccharide, and the like), a starch derivative, a salt of a starch derivative (e.g., a salt of carboxyalkyl starch, a salt of carboxymethyl starch, and the like, and any combination thereof), cellulose, a cellulose derivative, a salt of a cellulose derivative (e.g., a salt of carboxymethyl cellulose, and the like), a chitosan, a gelatin, guar gum, xanthan gum, dextran, a natural rubber, and any combination thereof.

Examples of suitable synthetic polymers for use as the swellable material for forming the swellable particulates of the present disclosure may include, but are not limited to, a polyacrylamide; a cross-linked polyacrylamide; a cross-linked polyacrylate; a cross-linked copolymer of acrylamide and acrylate monomers; a starch grafted with acrylonitrile and acrylate; a cross-linked polymer of two or more of allylsulfonate, 2-acrylamido-2-methyl-1-propanesulfonic acid, 3-allyloxy-2-hydroxy-1-propanesulfonic acid, acrylamide, and acrylic acid monomers; an elastomer rubber (e.g., acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulfonated polyethylene, ethylene acrylate rubber, epichlorohydrin ethylene oxide copolymer, ethylene propylene rubber, ethylene propylene diene terpolymer rubber, ethylene vinyl acetate copolymer, fluorosilicone rubbers, silicone rubbers, fluoro rubber, and the like, and any combination thereof); and any combination thereof.

In some embodiments, the swellable particulates described herein may be composed of a shape-memory alloy. Shape-memory alloys are metal alloys that can recover apparent permanent strains induced by external stimuli, such as temperature. The shape-memory alloys used as the swellable particulates may be compressed or collapsed in shape (e.g., volume) and swell upon taking their original (or stable) shape. Suitable shape-memory alloys may include, but not limited to, nickel-titanium alloy. In other embodiments, the swellable particulates may be of a swellable material that is a shape-memory alloy. A shape-memory polymer is a polymeric material that has the ability to return from a deformed state (temporary state) to their original (permanent) shape induced by an external stimuli, such as temperature. Like the shape-memory alloys, the shape-memory polymers may be compressed or collapsed in shape (e.g., volume) and swell upon taking their original (or stable) shape. Suitable shape-memory polymers for use in the present disclosure may include, but are not limited to, a copolymer having one or more polymers selected from the group consisting of, a polyamide (e.g., Nylon-6, Nylon-12, and the like, and any combination thereof), a polynoroborene, a polyethylene, a poly-ε-caprolactone, and any combination thereof (e.g., a polyethelyne/Nylon-6 graft copolymer).

In some embodiments, the swellable material may be used in combination with a filler material to add structural integrity to the swellable material for forming the swellable particulates described herein. Suitable filler materials may include any material capable of imparting structural integrity including, but not limited to, those described above with reference to the composite proppant particulates that may be used in the present disclosure.

Like the proppant particulates described above, the shape of the swellable particulates may be such that it is substantially spherical or substantially non-spherical, which may be cubic, polygonal, fibrous, or any other non-spherical shape. Such substantially non-spherical swellable particulates may be, for example, cubic-shaped, rectangular-shaped, rod-shaped, ellipse-shaped, cone-shaped, pyramid-shaped, cylinder-shaped, and any combination thereof. That is, in embodiments wherein the swellable particulates are substantially non-spherical, the aspect ratio of the material may range such that the material is fibrous to such that it is cubic, octagonal, or any other configuration.

As previously discussed, the swellable particulate of the present disclosure generally swell in the presence of an aqueous base fluid upon exposure over a certain period of time. Other external factors may additionally enhance or delay swelling including, but not limited to, temperature, stress (e.g., pressure exerted on the swellable particulates), pH, salinity, and the like.

Accordingly, the swellable particulates have an unswelled form and upon exposure to an aqueous base fluid, such as that in the treatment fluid, the swellable particulates may over time reach their full swelled form at a downhole location. That is, the full swelling of the swellable particulates does not occur until it is placed into a vertically oriented fracture, where it then completes swelling against the walls of the fracture to form the swelled particulates plug and thereafter, the proppant-free channels described herein.

In some embodiments, the swellable particulates described herein may have a density that is substantially similar to the density of the treatment fluid (i.e., the treatment fluid after the addition of the various components and any additives). By mirroring the density of the treatment fluid, the swellable particulates remain in suspension for swelling against the walls of a vertically oriented fracture to form the swelled particulates plugs described herein. Such similar densities additionally allow the swelled particulates plugs to form at various locations along the length of the vertically oriented fracture. Generally, the treatment fluid has a density in the range of a lower limit of about 0.75 grams per cubic centimeter (g/cm$^3$), 0.075 g/cm$^3$, 0.8 g/cm$^3$, 0.825 g/cm$^3$, 0.85 g/cm$^3$, 0.875 g/cm$^3$, 0.9 g/cm$^3$, 0.925 g/cm$^3$, 0.95 g/cm$^3$, 0.975 g/cm$^3$, and 1 g/cm$^3$ to an upper limit of about 1.25 g/cm$^3$, 1.225 g/cm$^3$, 1.2 g/cm$^3$, 1.175 g/cm$^3$, 1.15 g/cm$^3$, 1.125 g/cm$^3$, 1.1 g/cm$^3$, 1.075 g/cm$^3$, 1.05 g/cm$^3$, 1.025 g/cm$^3$, and 1 g/cm$^3$ of the aqueous base fluid in the treatment fluid, encompassing any value and subset therebetween. Each of these values is critical to the embodiments of the present disclosure and may be based on a number of factors including, but not limited to, the type of aqueous base fluid, the type of gelling agents used, any additives included, the fracture gradient of the formation if fracturing using the treatment fluid is performed, and the like. The swellable particulates may be in the range of +/−5% of the treatment fluid into which it is included for forming the swelled particulates plug(s) and proppant-free channel(s) described herein.

In some embodiments, the swellable particulates in their unswelled form of the present disclosure may have an average particle size distribution (d50) such that they are sized in the range of from a lower limit of 25 μm, 50 μm, 100 μm, 150 μm, 200 μm, 250 μm, 300 μm, 350 μm, 400 μm, 450 μm, and 500 μm to an upper limit of about 1000 μm, 950 μm, 900 μm, 850 μm, 800 μm, 750 μm, 700 μm, 650 μm, 600 μm, 550 μm, and 500 μm, encompassing any value and subset therebetween. Each of these values is critical to the embodiments of the present disclosure and may depend on a number of factors including, but not limited to, the type of swellable particulates selected, the swellability of the swellable particulates selected, the closure stress of the fracture, the geometry of the fracture, and the like.

Upon swelling, the swellable particulates may have an average particle size distribution (d50) that is in the range of a lower limit of about 100%, 250%, 500%, 750%, 1000%, 1250%, 1500%, 1750%, 2000%, 2250%, and 2500% to an upper limit of about 5000%, 4750%, 4500%, 4250%, 4000%, 3750%, 3500%, 3250%, 3000%, 2750%, and 2500% greater than the average particle size distribution of the unswelled swellable particulates, encompassing any value and subset therebetween. That is, the swellable particulates may swell to a size of greater than about 50 times the size of the unswelled swellable particulates, without departing from the scope of the present disclosure. Each of these values is critical to the embodiments of the present disclosure and may depend on a number of factors including, but not limited to, the geometry of the fracture (e.g., how much swelling is needed to form a swelled particulates plug), the closure stress of the fracture, the type of swellable particulates selected, the amount of swellable particulates selected, and the like. Accordingly, the swellable particulates, in some embodiments, may initially be the smaller (or much smaller) in size than the proppant particulates but once swelled, be similar or larger in size, without departing from the scope of the present disclosure.

In some embodiments, the swellable particulates may be present in the treatment fluid of the present disclosure in an amount in the range of a lower limit of about 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% by weight of the proppant particulates in the treatment fluid, encompassing any value and subset therebetween. Each of these values is critical to the embodiments of the present disclosure and may depend on a number of factors including, but not limited to, the type of swellable particulates selected, the amount of swellability of the swellable particulates, the geometry of the fracture, the closure stress of the fracture, and the like.

In some embodiments, the swellable particulates may be encapsulated in an encapsulating material. The encapsulating material may serve to delay the swelling of the swellable particulates, such as by use of a degradable encapsulating material that degrades downhole, upon which swelling of the swellable material may occur after removal of the encapsulating material. For example, the encapsulating material may delay contact between the aqueous base fluid in the treatment fluid and the swellable particulates until the encapsulating material is degraded or sufficiently degraded to allow swelling. As used herein, the term "encapsulated" does not imply complete coverage of the encapsulating material about the swellable particulates, as such coverage may not be necessary to delay swelling, but rather that at least about 50% (or at least about 60%, 70%, 80%, 90%, or 100%) of the outer surface of the swellable particulates is encapsulated with the encapsulating material.

The encapsulating material may be any material capable of delaying the action of the swellable particulates (i.e., delaying the swelling of the swellable particulates) including, but not limited to, a wax, polyvinyl alcohol, a polymer, a protein, a polysaccharide, a degradable material, or any combination thereof. Examples of such encapsulating materials may include, but are not limited to, polylactic acid, polyglycolic acid, a polyamide, a polyalkylene glycol (e.g., polyethylene glycol), polyvinyl alcohol, polyvinyl ester, polysiloxane, polyurethane, polyurethane copolymers, polyacrylic acid, a polyacrylic acid derivative, collagen, gelatin, a cellulose derivative (e.g., alkyl cellulose, hydroxyalkyl cellulose, cellulose acetate, and the like), and any combination thereof.

In some embodiments, the treatment fluids of the present disclosure may further comprise an additive including, but not limited to, a salt, a weighting agent, a fluid loss control agent, an emulsifier, a dispersion aid, a corrosion inhibitor, an emulsion thinner, an emulsion thickener, a viscosifying agent, a lost circulation material, a foaming agent, a gas, a pH control additive, a breaker, a biocide, a stabilizer, a chelating agent, a scale inhibitor, a gas hydrate inhibitor, a mutual solvent, an oxidizer, a reducer, a friction reducer, a clay stabilizing agent, and any combination thereof.

In various embodiments, systems configured for delivering the treatment fluids (referred to simply as "fluids" below) described herein to a downhole location are described. In various embodiments, the systems can comprise a pump fluidly coupled to a tubular, the tubular containing the fluids described herein.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the fluids to a subterranean formation at or above a fracture gradient of the subterranean formation, but it may also be used in cases where fracturing is not desired. In some embodiments, the high pressure pump may be capable of fluidly conveying particulate matter, such as the micro-sized proppant particulates and/or the micro-sized proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the fluids to the high pressure pump. In such embodiments, the low pressure pump may "step up" the pressure of the fluids before reaching the high pressure pump.

In some embodiments, the systems described herein can further comprise a mixing tank that is upstream of the pump and in which the fluids are formulated. In various embodiments, the pump (e.g., a low pressure pump, a high pressure pump, or a combination thereof) may convey the fluids from the mixing tank or other source of the fluids to the tubular. In other embodiments, however, the fluids may be formulated offsite and transported to a worksite, in which case the fluid may be introduced to the tubular via the pump directly from its shipping container (e.g., a truck, a railcar, a barge, or the like) or from a transport pipeline. In either case, the fluids may be drawn into the pump, elevated to an appropriate pressure, and then introduced into the tubular for delivery downhole.

Figure 2:
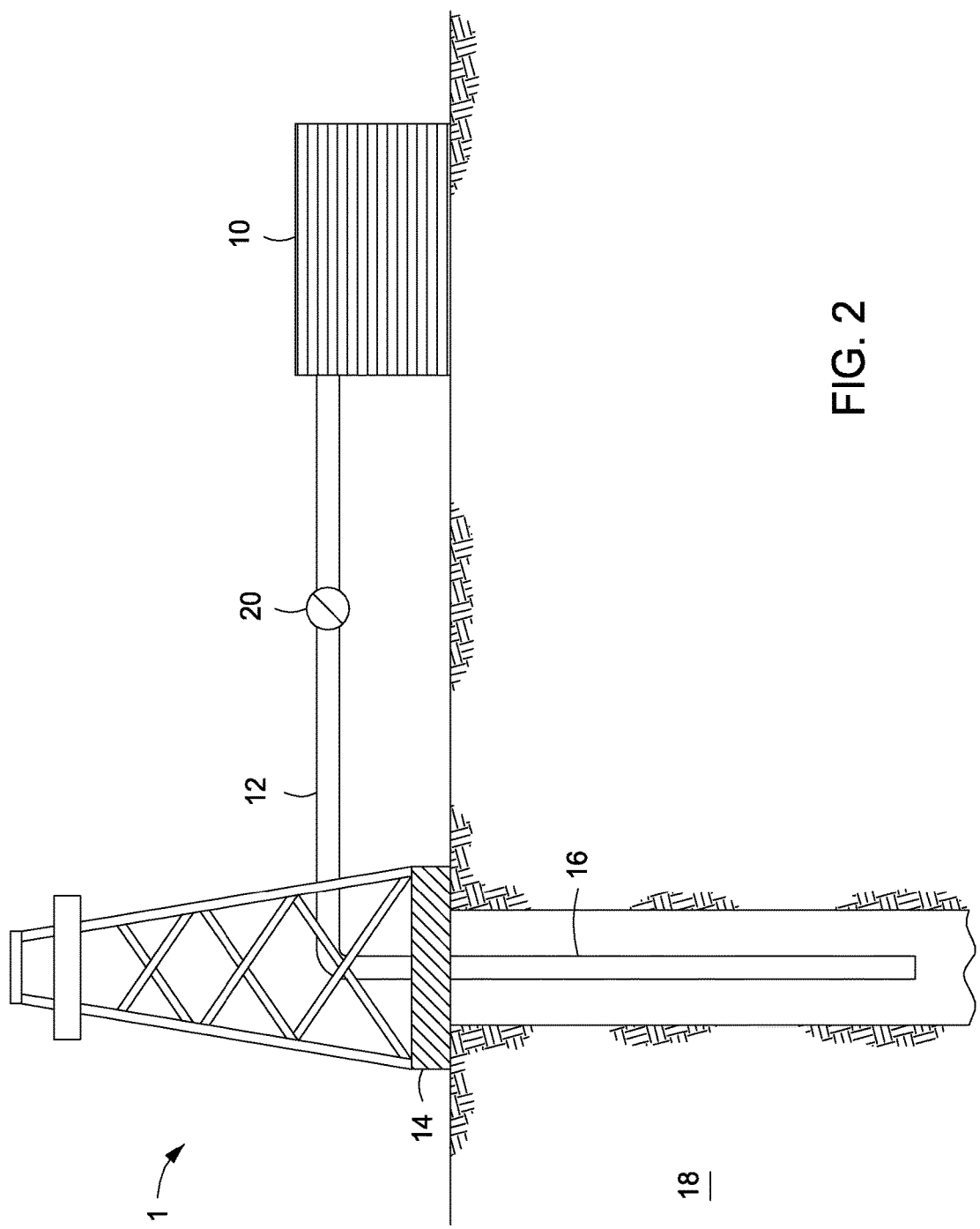
FIG. 2 depicts an embodiment of a system configured for delivering various fluids of the embodiments described herein to a downhole location.

FIG. 2 shows an illustrative schematic of a system that can deliver the fluids of the present disclosure to a downhole location, according to one or more embodiments. It should be noted that while FIG. 2 generally depicts a land-based system, it is to be recognized that like systems may be operated in subsea locations as well. As depicted in FIG. 2, system 1 may include mixing tank 10, in which the fluids of the embodiments herein may be formulated. The fluids may be conveyed via line 12 to wellhead 14, where the fluids enter tubular 16, tubular 16 extending from wellhead 14 into subterranean formation 18. Upon being ejected from tubular 16, the fluids may subsequently penetrate into subterranean formation 18. Pump 20 may be configured to raise the pressure of the fluids to a desired degree before introduction into tubular 16.

The tubular 16 forming an annulus between the tubular 16 and the wellbore in the subterranean formation 18. Any one or more of the fluids described herein may accordingly be introduced through the interior of the tubular 16 or through the annulus, without departing from the scope of the present disclosure.

It is to be recognized that system 1 is merely exemplary in nature and various additional components may be present that have not necessarily been depicted in FIG. 2 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 2, the fluid may, in some embodiments, flow back to wellhead 14 and exit subterranean formation 18. In some embodiments, the fluid that has flowed back to wellhead 14 may subsequently be recovered and recirculated to subterranean formation 18.

It is also to be recognized that the disclosed fluids may also directly or indirectly affect the various downhole equipment and tools that may come into contact with the fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 2.

Embodiments disclosed herein include Embodiment A and Embodiment B:

Embodiment A

A method of treating a subterranean formation having a vertically oriented fracture disposed at true vertical or deviated up to 30° from true vertical comprising: providing a treatment fluid comprising an aqueous base fluid, a gelling agent, proppant particulates, and swellable particulates having an unswelled form and a swelled form; placing the treatment fluid into the vertically oriented fracture; swelling the swellable particulates at a first location against walls of the vertically oriented fracture, thereby forming a first swelled particulates plug; swelling the swellable particulates at a second location above or below the first location against the walls of the vertically oriented fracture, thereby forming a second swelled particulates plug; and settling the proppant particulates atop the first swelled particulates plug and the second swelled particulates plug, wherein if the second swelled particulates plug is formed above the first swelled particulates plug, a proppant-free channel is formed below the second swelled particulates plug and above the settled proppant particulates atop the first swelled particulates plug, and wherein if the second swelled particulates plug is formed below the first swelled particulates plug, a proppant-free channel is formed below the first swelled particulates plug and above the settled proppant particulates atop the second swelled particulates plug.

Embodiment B

A method of treating a subterranean formation having a vertically oriented fracture disposed at true vertical or deviated up to 30° from true vertical comprising: providing a treatment fluid comprising an aqueous base fluid, a gelling agent, proppant particulates, and swellable particulates having an unswelled form and a swelled form, and wherein the density of the swellable particulates is between no more than less than about 5% and no more than greater than about 5% of the density of the treatment fluid; placing the treatment fluid into the vertically oriented fracture; swelling the swellable particulates at a first location against walls of the vertically oriented fracture, thereby forming a first swelled particulates plug; swelling the swellable particulates at a second location above or below the first location against the walls of the vertically oriented fracture, thereby forming a second swelled particulates plug; and settling the proppant particulates atop the first swelled particulates plug and the second swelled particulates plug, wherein if the second swelled particulates plug is formed above the first swelled particulates plug, a proppant-free channel is formed below the second swelled particulates plug and above the settled proppant particulates atop the first swelled particulates plug, and wherein if the second swelled particulates plug is formed below the first swelled particulates plug, a proppant-free channel is formed below the first swelled particulates plug and above the settled proppant particulates atop the second swelled particles plug.

Embodiments A and B may have one or more of the following additional elements in any combination:

Element 1: Wherein the proppant particulates have an average particle distribution in the range of about 10 µm to about 2000 µm.

Element 2: Wherein the unswelled form of the swellable particulates has an average particle distribution in the range of about 25 µm to about 1000 µm.

Element 3: Wherein the unswelled form of the swellable particulates has an average particle distribution in the range of about 25 µm to about 1000 µm, and wherein the swelled form of the swellable particulates has an average particle size distribution in the range of 100% to about 5000% greater than the unswelled form.

Element 4: Wherein the proppant particulates are present in the treatment fluid in an amount in the range of about 0.1 lbm/gal to about 20 lbm/gal of the aqueous base fluid.

Element 5: Wherein the swellable particulates are present in an amount in the range of about 1% to about 20% by weight of the proppant particulates.

Element 6: Wherein the swellable particulates selected from the group consisting of a swellable material particle, a non-swellable particle coated with a swellable material, and any combination thereof, and wherein the swellable material is selected from the group consisting of a natural polymer, a synthetic polymer, a shape-memory alloy, a shape-memory polymer, and any combination thereof.

Element 7: Wherein the swellable particulates selected from the group consisting of a swellable material particle, a non-swellable particle coated with a swellable material, and any combination thereof, and wherein the swellable material is a natural polymer selected from the group consisting of a polysaccharide, a salt of a polysaccharide, a starch derivative, a salt of a starch derivative, cellulose, a cellulose derivative, a salt of a cellulose derivative, a chitosan, a gelatin, guar gum, xanthan gum, dextran, a natural rubber, and any combination thereof.

Element 8: Wherein the swellable particulates selected from the group consisting of a swellable material particle, a non-swellable particle coated with a swellable material, and any combination thereof, and wherein the swellable material is a synthetic polymer selected from the group consisting of a polyacrylamide; a cross-linked polyacrylamide; a cross-linked polyacrylate; a cross-linked copolymer of acrylamide and acrylate monomers; a starch grafted with acrylonitrile and acrylate; a cross-linked polymer of two or more of allylsulfonates, 2-acrylamido-2-methyl-1-propanesulfonic acid, 3-allyloxy-2-hydroxy-1-propanesulfonic acid, acrylamide, and acrylic acid monomers; an elastomer rubber; and any combination thereof.

Element 9: Wherein the swellable particulates selected from the group consisting of a swellable material particle, a non-swellable particle coated with a swellable material, and any combination thereof, and wherein the swellable material is a shape-memory alloy that is a nickel-titanium alloy.

Element 10: Wherein the swellable particulates selected from the group consisting of a swellable material particle, a non-swellable particle coated with a swellable material, and any combination thereof, and wherein the swellable material is a shape-memory polymer, that is a copolymer having one or more polymers selected from the group consisting of, a polyamide, a polynoroborene, a polyethylene, a poly-ε-caprolactone, and any combination thereof.

Element 11: Wherein the swellable particulates are encapsulated with an encapsulating material.

Element 12: Wherein the proppant particulates are coated with a curable resin composition.

Element 13: Further comprising a tubular extending into the subterranean formation, and a pump fluidly coupled to the tubular, wherein the treatment fluid is introduced into the subterranean formation through the tubular.

By way of non-limiting example, exemplary combinations applicable to A and B include: A and/or B with 1, 4, 6, and 10; A and/or B with 2, 3, 9, and 13; A and/or B with 1, 2, 3, 4, 5, 6, 7, 8, 9, 10, 11, 12, and 13; A and/or B with 1, 4, 6, 8, and 9; A and/or B with 2 and 7; A and/or B with 6 and 11; A and/or B with 3, 9, 10, and 12; A and/or B with 4, 12, and 13; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method of treating a subterranean formation having a vertically oriented fracture disposed at true vertical or deviated up to 30° from true vertical comprising:
   providing a treatment fluid comprising an aqueous base fluid, a gelling agent, proppant particulates, and swellable particulates having an unswelled form and a swelled form,
   wherein the density of the treatment fluid comprising the aqueous base fluid, the gelling agent, and the proppant particulates is about 0.75 g/cm³ to about 1.25 g/cm³,
   wherein the density of the swellable particulates is about 95% to about 105% of the density of the transmit fluid, and
   wherein the treatment fluid is a homogenous mixture upon introduction into the vertically oriented fracture;
   placing the treatment fluid into the vertically oriented fracture;
   swelling the swellable particulates at a first location against walls of the vertically oriented fracture, thereby forming a first swelled particulates plug;
   swelling the swellable particulates at a second location above or below the first location against the walls of the vertically oriented fracture, thereby forming a second swelled particulates plug; and
   settling the proppant particulates atop the first swelled particulates plug and the second swelled particulates plug,
   wherein if the second swelled particulates plug is formed above the first swelled particulates plug, a proppant-free channel is formed below the second swelled particulates plug and above the settled proppant particulates atop the first swelled particulates plug, and
   wherein if the second swelled particulates plug is formed below the first swelled particulates plug, a proppant-free channel is formed below the first swelled particulates plug and above the settled proppant particulates atop the second swelled particulates plug.

2. The method of claim 1, wherein the proppant particulates have an average particle distribution in the range of about 10 μm to about 2000 μm.

3. The method of claim 1, wherein the unswelled form of the swellable particulates has an average particle distribution in the range of about 25 μm to about 1000 μm.

4. The method of claim 1, wherein the swelled form of the swellable particulates has an average particle size distribution in the range of 100% to about 5000% greater than the unswelled form.

5. The method of claim 1, wherein the proppant particulates are present in the treatment fluid in an amount in the range of about 0.1 lbm/gal to about 20 lbm/gal of the aqueous base fluid.

6. The method of claim 1, wherein the swellable particulates are present in an amount in the range of about 1% to about 20% by weight of the proppant particulates.

7. The method of claim 1, wherein the swellable particulates selected from the group consisting of a swellable material particle, a non-swellable particle coated with a swellable material, and any combination thereof, and
   wherein the swellable material is selected from the group consisting of a natural polymer, a synthetic polymer, a shape-memory alloy, a shape-memory polymer, and any combination thereof.

8. The method of claim 7, wherein the natural polymer is selected from the group consisting of a polysaccharide, a salt of a polysaccharide, a starch derivative, a salt of a starch derivative, cellulose, a cellulose derivative, a salt of a cellulose derivative, a chitosan, a gelatin, guar gum, xanthan gum, dextran, a natural rubber, and any combination thereof.

9. The method of claim 7, wherein the synthetic polymer is selected from the group consisting of a polyacrylamide; a cross-linked polyacrylamide; a cross-linked polyacrylate; a cross-linked copolymer of acrylamide and acrylate monomers; a starch grafted with acrylonitrile and acrylate; a cross-linked polymer of two or more of allylsulfonates, 2-acrylamido-2-methyl-1-propanesulfonic acid, 3-allyloxy-2-hydroxy-1-propanesulfonic acid, acrylamide, and acrylic acid monomers; an elastomer rubber; and any combination thereof.

10. The method of claim 7, wherein the shape-memory alloy is a nickel-titanium alloy.

11. The method of claim 7, wherein the shape-memory polymer is a copolymer having one or more polymers selected from the group consisting of, a polyamide, a polynoroborene, a polyethylene, a poly-ε-caprolactone, and any combination thereof.

12. The method of claim 1, wherein the swellable particulates are encapsulated with an encapsulating material.

13. The method of claim 1, wherein the proppant particulates are coated with a curable resin composition.

14. The method of claim 1, further comprising a tubular extending into the subterranean formation, and a pump fluidly coupled to the tubular,
   wherein the treatment fluid is introduced into the subterranean formation through the tubular.

15. A method of treating a subterranean formation having a vertically oriented fracture disposed at true vertical or deviated up to 30° from true vertical comprising:
   providing a treatment fluid comprising an aqueous base fluid, a gelling agent, proppant particulates, and swellable particulates having an unswelled form and a swelled form,
   wherein the density of the treatment fluid comprising the aqueous base fluid, the gelling agent, and the proppant particulates is about 0.75 g/cm$^3$ to about 1.25 g/cm$^3$,
   wherein the density of the swellable particulates is about 95% to about 105% of the density of the treatment fluid, and
   wherein the treatment fluid is homogenous mixture upon introduction into the vertically oriented fracture;
   placing the treatment fluid into the vertically oriented fracture;
   swelling the swellable particulates at a first location against walls of the vertically oriented fracture, thereby forming a first swelled particulates plug;
   swelling the swellable particulates at a second location above or below the first location against the walls of the vertically oriented fracture, thereby forming a second swelled particulates plug; and
   settling the proppant particulates atop the first swelled particulates plug and the second swelled particulates plug,
   wherein if the second swelled particulates plug is formed above the first swelled particulates plug, a proppant-free channel is formed below the second swelled particulates plug and above the settled proppant particulates atop the first swelled particulates plug, and
   wherein if the second swelled particulates plug is formed below the first swelled particulates plug, a proppant-free channel is formed below the first swelled particulates plug and above the settled proppant particulates atop the second swelled particles plug.

16. The method of claim 15, wherein the proppant particulates have an average particle distribution in the range of about 10 μm to about 2000 μm.

17. The method of claim 15, wherein the unswelled form of the swellable particulates has an average particle distribution in the range of about 25 μm to about 1000 μm.

18. The method of claim 15, wherein the swellable particulates selected from the group consisting of a swellable material particle, a non-swellable particle coated with a swellable material, and any combination thereof, and
   wherein the swellable material is selected from the group consisting of a natural polymer, a synthetic polymer, a shape-memory alloy, a shape-memory polymer, and any combination thereof.

19. The method of claim 15, wherein the swellable particulates are present in an amount in the range of about 1% to about 20% by weight of the proppant particulates.

20. The method of claim 15, further comprising a tubular extending into the subterranean formation, and a pump fluidly coupled to the tubular,
   wherein the treatment fluid is introduced into the subterranean formation through the tubular.

* * * * *